(12) United States Patent
Greenwood et al.

(10) Patent No.: US 7,367,754 B1
(45) Date of Patent: May 6, 2008

(54) VARIABLE HELIX ROTARY CUTTING TOOL

(76) Inventors: Mark L. Greenwood, 875 Rae Drive, Hartland, WI (US) 53029; Kevin J. Cranker, W366 S4385 Highway 67, Dousman, WI (US) 53118

(*) Notice: Subject to any disclaimer, the term of this patent is extended or adjusted under 35 U.S.C. 154(b) by 0 days.

(21) Appl. No.: 11/483,037

(22) Filed: Jul. 7, 2006

(51) Int. Cl.
B23C 5/10 (2006.01)

(52) U.S. Cl. .......................... 407/63; 407/59; 407/60; 407/61

(58) Field of Classification Search .............. 407/53, 407/63, 54, 59, 60, 61, 62, 40, 42, 34
See application file for complete search history.

(56) References Cited

U.S. PATENT DOCUMENTS

| | | | |
|---|---|---|---|
| 1,963,611 A | 6/1934 | Brumell et al. | |
| 2,782,490 A | 2/1957 | Graves | |
| 3,726,351 A | 4/1973 | Williams, Jr. | |
| 4,149,821 A | 4/1979 | Faber | |
| 4,212,568 A | 7/1980 | Minicozzi | |
| 4,230,429 A | 10/1980 | Eckle | |
| 4,963,059 A * | 10/1990 | Hiyama | 407/60 |
| 5,049,011 A | 9/1991 | Bohnet et al. | |
| D328,557 S | 8/1992 | Nishimura | |
| 5,222,847 A * | 6/1993 | Hiyama et al. | 408/222 |
| 5,302,059 A | 4/1994 | Fabiano | |
| 5,323,823 A | 6/1994 | Kopras | |
| 5,779,399 A | 7/1998 | Kuberski | |
| 5,947,659 A | 9/1999 | Mays | |
| D430,584 S | 9/2000 | Kouvelis | |
| D445,436 S | 7/2001 | George | |
| 6,652,203 B1 | 11/2003 | Risen, Jr. | |
| 6,698,981 B1 | 3/2004 | Beno | |
| 6,991,409 B2 * | 1/2006 | Noland | 407/63 |
| 7,153,067 B2 * | 12/2006 | Greenwood et al. | 407/53 |
| 7,223,053 B2 * | 5/2007 | Flynn | 407/53 |
| 2002/0090273 A1 | 7/2002 | Serwa | |
| 2003/0118411 A1 | 6/2003 | Flynn et al. | |
| 2003/0185640 A1 | 10/2003 | Ito | |
| 2004/0057803 A1 | 3/2004 | Walrath | |
| 2004/0258490 A1 | 12/2004 | Walrath | |

* cited by examiner

*Primary Examiner*—Willmon Fridie, Jr.
(74) *Attorney, Agent, or Firm*—Eric Karich

(57) ABSTRACT

A rotary cutting tool has a substantially cylindrical main body and four flutes. The main body has a shank end, a cutting end formed integrally opposite the shank end, and a longitudinal axis of rotation. The four flutes include a pair of flutes comprising a first flute and a second flute formed on opposite sides of the main body, and each of the pair of flutes are symmetrical and have the same helix angle. A third flute is formed on one side of the main body between the pair of flutes, and defines a helical cutting edge having a helix angle that is different than the helix angle of the pair of flutes. A fourth flute is formed on the other side of the main body, and defines a helical cutting edge having a helix angle that is different than the helix angle of the pair of flutes and different than the helix angle of the third flute.

13 Claims, 1 Drawing Sheet

VARIABLE HELIX ROTARY CUTTING TOOL

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to rotary cutting tools and end mills, and more particularly to helically fluted end mills having variable helical angles for improved performance characteristics.

2. Description of Related Art

Rotary cutting tools are used for various machining operations on workpieces. An end mill cutter or "end mill" is a type of rotary cutting tool. Machine operations often carried out using an end mill cutter include the forming of slots, keyways, and pockets. During typical use of an end mill cutter, a milling machine rotatably drives the end mill cutter about its longitudinal axis, and various cutting edges of the end mill cutter are used to remove material from a workpiece.

Over time, the cutting edges of an end mill cutter become dull due to physical contact between the end mill cutter and workpieces. As the cutting edges become dull, internal stresses generated within the end mill cutter during use increase. Harmonic vibrations constitute major sources of internal stresses in end mill cutters. It is common for end mill cutters to break during use due to the internal stresses. One way of extending the operation life of a end mill cutter is to reduce the amplitudes of harmonic vibrations generated within the tool during use.

It would thus be beneficial to have an end mill cutter wherein amplitudes of harmonic vibrations generated within the tool during use are reduced. The operational life of such an end mill cutter would expectedly be extended significantly.

The state of the art includes the following:

Hiyama, U.S. Pat. No. 4,963,059, teaches a rotary cutting tool that includes four axial flutes. The four axial flutes have cutting edges that form two symmetrical pairs. Each of the pairs has a different helix angle from the another pair. Furthermore, the cutting edges are all equally spaced from one another at one point along the length of the cutting tool.

Noland, U.S. Pat. No. 6,991,409, teaches a rotary cutting tool that includes four axial flutes that extend from an end surface to a fluted cutting end and each includes a cutting edge. The cutting edges are unequally spaced along the circumference of the end surface lying in a plane perpendicular to the longitudinal axis of rotation. In addition, all cutting edges are of a different helix from one another and the cutting edge geometries vary from one another to create a different sound pattern that reduces resonant harmonic vibrations.

While Hiyama teaches two pairs of symmetrical flutes that differ from each other, and while Noland teaches all four flutes being variable, neither teaches the optimum combination of one symmetrical pair of flutes and two flutes with different helix angles.

Flynn, et al, U.S. 2003/0118411 A1, teaches an end mill that include a flute having a helix which varies along the length of the tool. The end mill may include varying numbers of flutes, whether odd or even; helix change(s) within a flute or between flutes; or indexing between cutting edges or flutes. A 'slow' or 'high' helix may be used at the end or starting point of the tool, depending upon the application. A slow helix at the end or starting point is desirable for a strong corner in ramping and plunging into the material. When a higher helix is used at the end transitioning to a smaller helix at the shank, the corner is also protected because of the helix change. The high helix at the tip may be needed for shearing action in a given material.

Risen, Jr., U.S. Pat. No. 6,652,203 B1, teaches a precision drill bit that includes at least one cutting flute extends along the length of the bit and exhibits a helix angle of about 38 degrees at the tip. The helix angle decreases to an angle of about 15 degrees at the end of the flute run-out. The helix angle changes progressively and substantially linearly over a number of segments along the length of the drill bit.

Ito, U.S. 2003/0185640 A1, teaches a dual rake twist drill bit for drilling holes in articles made of abrasive materials (fiberglass-filled printed circuit boards, which relatively quickly dull bits). The bit includes spiraled flutes with cutting lips and inclined to the axis of the bit at a relatively small helix angle or rake in the range of about 3 degrees to 10 degrees. A longer rear portion which the flutes and cutting lips have a larger rake of about 33 degrees. The dual rake bit has substantially greater wear resistance than single rake bits. In a modification of the dual rake bit, the central web portion has a front longitudinal portion which is relatively acutely tapered, and a rear portion which is relatively modestly tapered, the dual tapered construction increasing resistance of the bit to breaking.

Walrath, U.S. 2004/0057803 A1 and U.S. 2004/0258490, teach a rotary end-mill having a deferential flute construction with all individual flutes being unequally spaced about the circumference of the cylindrical tool body at different helix angles. The cutting edge of these flutes also face in the direction of tool rotation.

Other references of interest include the following: C. O. Graves, U.S. Pat. No. 2,782,490; H. P. Brumell et al, U.S. Pat. No. 1,963,611; Kuberski, U.S. Pat. No. 5,779,399; George, U.S. Des. 445,436; Kouvelis, U.S. Des. 430,584; and Nishimura, U.S. Des. 328,557.

All of the above-described references are hereby incorporated by reference in full.

SUMMARY OF THE INVENTION

The present invention teaches certain benefits in construction and use which give rise to the objectives described below.

The present invention provides a rotary cutting tool that includes a substantially cylindrical main body and four flutes. The main body has a shank end, a cutting end formed integrally opposite the shank end, and a longitudinal axis of rotation. The four flutes include a pair of flutes comprising a first flute and a second flute formed on opposite sides of the main body, and each of the pair of flutes are symmetrical and have the same helix angle. A third flute is formed on one side of the main body between the pair of flutes, and defines a helical cutting edge having a helix angle that is different than the helix angle of the pair of flutes. A fourth flute is formed on the other side of the main body, and defines a helical cutting edge having a helix angle that is different than the helix angle of the pair of flutes and different than the helix angle of the third flute.

A primary objective of the present invention is to provide a rotary cutting tool having advantages not taught by the prior art.

Another objective is to provide a rotary cutting tool that includes four flutes, a pair of symmetrical flutes that have the same helix angle, and third and fourth flutes interleaved between the pair of flutes, each of the third and fourth flutes having helix angles that are different than the pair of flutes and each other.

A further objective is to provide a rotary cutting tool that has reduced harmonic vibrations, a reduced rate of wear, and an increased life.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
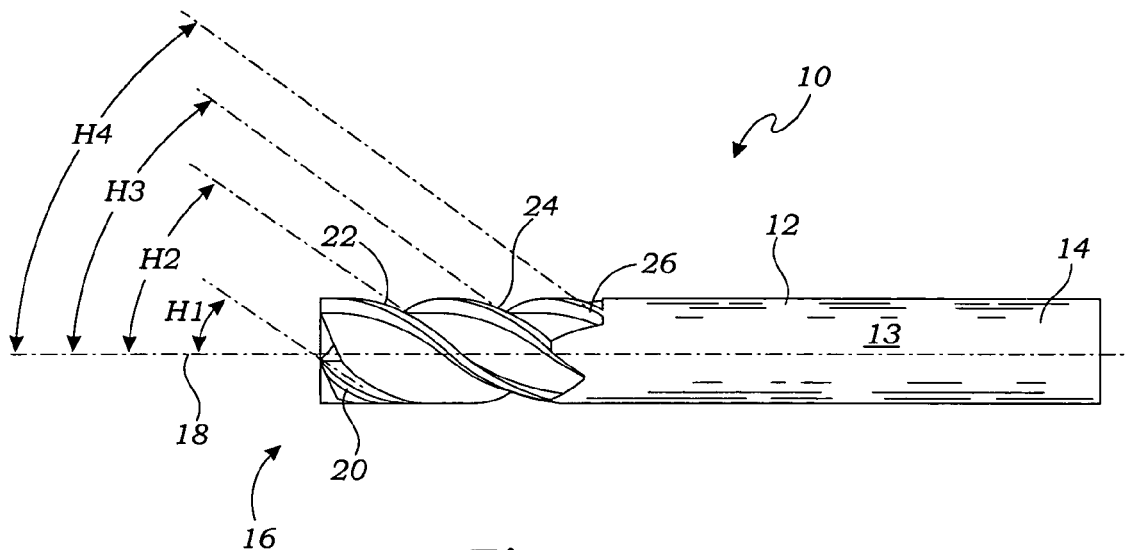
FIG. 1 is a side elevation view of one embodiment of a rotary cutting tool including a substantially cylindrical main body having a cutting end, a shank end, and four flutes.

FIG. 1 is a side elevation view of one embodiment of a rotary cutting tool 10 including a substantially cylindrical main body 12 having a shank end 14 at one end and a cutting end 16 formed integrally opposite the shank end 14. The main body 12 having a longitudinal axis of rotation 18. In the embodiment of FIG. 1, the rotary cutting tool 10 is an end milling cutter or "end mill," and has a pair of flutes 20 and 22 comprising a first flute 20 and a second flute 22, interleaved with a third flute 24 and a fourth flute 26 about an outer surface 13 of the main body 12. That is, members of the pairs of flutes 20 and 22 alternate with either the third flute 24 or fourth flute 26 about the outer surface 13 of the main body 12.

Figure 2:
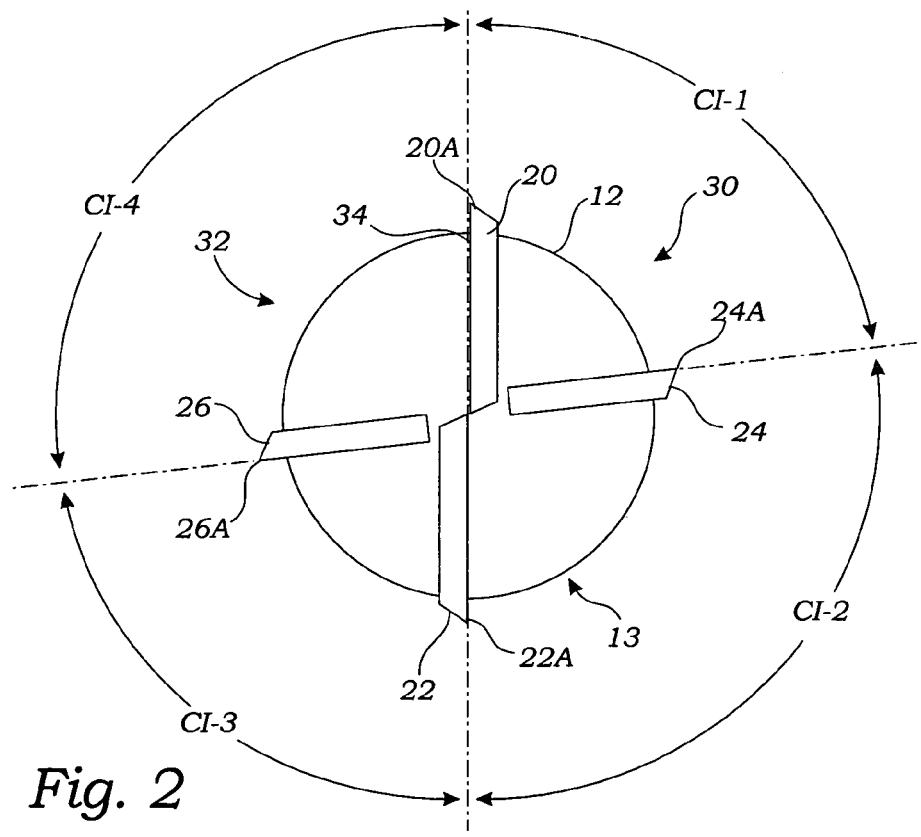
FIG. 2 is an end view of the rotary cutting tool of FIG. 1 illustrating the cutting end of the main body and the circumferential index of the four flutes.

As shown in FIGS. 1 and 2, the pair of flutes 20 and 22 are formed on opposite sides of the main body 12, and each of the pair of flutes 20 and 22 extends continuously from the cutting end 16 towards the shank end 14. Each of the pair of flutes 20 and 22 define a helical cutting edge, 20A and 22A respectively, which has a helix angle H1 and H3, which is the angle formed between the axis 18 of the substantially cylindrical main body 12 and a tangent line of the helical cutting edge. In one embodiment, the helix angles H1 and H3 are between 30-45 degrees with respect to the longitudinal axis of rotation 18 of the main body 12. It is important that the pair of flutes 20 and 22 are symmetrical and that each of the helix angles H1 and H3 are the same. In the preferred embodiment, the helix angles H1 and H3 are between 33-42 degrees, most preferably about 37 degrees.

The third flute 24 is formed on one side 30 of the main body 12 between the pair of flutes 20 and 22, and the third flute 24 defines a helical cutting edge 24A having a helix angle H2 that different than the helix angle (H1 and H3) of the pair of flutes 20 and 22. The third flute 24 has a helix angle of between 30-45 degrees, preferably between 33-42 degrees, and most preferably about 33 degrees.

The fourth flute 26 is formed on the other side 32 of the main body 12, between the pair of flutes 20 and 22 and generally opposite the third flute 24. The fourth flute 26 defines a helical cutting edge 26A having a helix angle H4 that is different than the helix angle (H1 and H3) of the pair of flutes 20 and 22 and different than the helix angle H2 of the third flute 24. The fourth flute 26 has a helix angle of between 30-45 degrees, preferably between 33-42 degrees, and most preferably about 34 degrees. For purposes of this application, all helix angle measurements are +/−0.5 degrees.

As shown in FIG. 2, the first flute 20 is separated from the third flute 24 by a first circumferential index CI-1. The second flute 22 is separated from the third flute 24 by a second circumferential index CI-2. The second flute 22 is separated from the fourth flute 26 by a third circumferential index CI-3. The fourth flute 26 is separated from the first flute 20 by a fourth circumferential index CI-4. In the preferred embodiment, the circumferential indexes CI-1-4 all vary with respect to each other at all points along the length of the main body 12.

Providing helical cutting edges with helix angles H1, H2, H3, and H4, with H1 and H3 being the same and with the pair of flutes 20 and 22 being symmetrical has been found to substantially extend the operational life of the rotary cutting tool 10. It is believed that these helix angles serve to reduce amplitudes of harmonic vibrations generated within the rotary cutting tool 10 during use, thereby substantially extending the operational life of the rotary cutting tool 10.

The rotary cutting tool 10 of FIGS. 1-2 is preferably made from at least one metal. Suitable metals and metal alloys include steel (including high speed steel and stainless steel), cast iron, carbide (an alloy including cobalt and tungsten), and titanium. A portion of the rotary cutting tool 10 including the four helical cutting edges is preferably coated with a wear reducing material. Suitable wear reducing materials include titanium nitride (TiN), titanium aluminum nitride (TiAlN), titanium carbonitride (TiCN), zirconium nitride (ZrN), and aluminum titanium nitride (AlTiN).

Three separate tests were conducted over several months to compare the operational effectiveness of the rotary cutting tool 10 of FIGS. 1-2 to other commonly used and commercially available end mill cutters. In each of these tests, the operational life of the rotary cutting tool 10 exceeded the operational lives of the other end mill cutters. It is believed that the helix angles used in the rotary cutting tool 10 and described above reduced amplitudes of harmonic vibrations generated within the rotary cutting tool 10 during use, thereby substantially extending the operational life of the rotary cutting tool 10. In each test, the greater operational life of the rotary cutting tool 10 represented a significant savings in both operating time and operating cost.

An operational test of the rotary cutting tool 10 of FIGS. 1-2 was conducted on Mar. 28, 2006, which showed a significant improvement of the present cutter 10 over the prior art. In the operational test, a four flute variable helix end mill cutter manufactured by Hanita Cutting Tools, Inc., of Springfield, N.J., was compared against the rotary cutting tool 10 of the present application. Both end mills were operated under similar conditions to perform similar milling operations on similar materials. During the operational test, the Hanita end mill cutter maintained an average tool life of 153 minutes per edge. The cutting tool 10 of the present invention maintained an average of 196 minutes per edge.

As illustrated by the above-described test, the geometries provided in the present invention provide a significant improvement in wear life of the cutting tool 10, and represent a significant advance in the state of the art.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A rotary cutting tool, comprising:
    a substantially cylindrical main body having a shank end and a cutting end formed integrally opposite the shank end, the main body having a longitudinal axis of rotation;
    a pair of flutes comprising a first flute and a second flute formed on opposite sides of the main body, wherein each of the pair of flutes extends continuously from the cutting end towards the shank end, each of the pair of flutes defining a helical cutting edge having a helix angle with respect to the longitudinal axis of rotation of the main body;
    wherein the pair of flutes are symmetrical and have the same helix angle;
    a third flute formed on one side of the main body between the pair of flutes, the third flute defining a helical cutting edge having a helix angle that is different than the helix angle of the pair of flutes; and
    a fourth flute formed on the other side of the main body, between the pair of flutes and generally opposite the third flute, the fourth flute defining a helical cutting edge having a helix angle that is different than the helix angle of the pair of flutes and different than the helix angle of the third flute.

2. The rotary cutting tool as recited in claim 1, wherein the first flute is separated from the third flute by a first circumferential index, wherein the second flute separated from the third flute by a second circumferential index, wherein the second flute is separated from the fourth flute by a third circumferential index, wherein the fourth flute is separated from the first flute by a fourth circumferential index, and wherein the circumferential indexes all vary with respect to each other at all points along the length of the main body.

3. The rotary cutting tool as recited in claim 1, wherein the helix angles of each of the pair of flutes is between 30-45 degrees.

4. The rotary cutting tool as recited in claim 1, wherein the helix angles of each of the pair of flutes is between 33-42 degrees.

5. The rotary cutting tool as recited in claim 1, wherein the helix angles of each of the pair of flutes is about 37 degrees.

6. The rotary cutting tool as recited in claim 1, wherein the helix angle of the third flute is between 30-45 degrees.

7. The rotary cutting tool as recited in claim 1, wherein the helix angle of the third flute is between 33-42 degrees.

8. The rotary cutting tool as recited in claim 1, wherein the helix angle of the third flute is about 33 degrees.

9. The rotary cutting tool as recited in claim 1, wherein the helix angle of the fourth flute is between 30-45 degrees.

10. The rotary cutting tool as recited in claim 1, wherein the helix angle of the fourth flute is between 33-42 degrees.

11. The rotary cutting tool as recited in claim 1, wherein the helix angle of the fourth flute is about 34.

12. The rotary cutting tool as recited in claim 1, wherein the helix angles of the first and second flutes are between 33-42 degrees, wherein the helix angle of the third flute is between 33-42 degrees, and wherein the helix angle of the fourth flute is between 33-42 degrees.

13. The rotary cutting tool as recited in claim 1, wherein the helix angles of the first and second flutes are about 37 degrees, wherein the helix angle of the third flute is about 33 degrees, and wherein the helix angle of the fourth flute is about 34 degrees.

\* \* \* \* \*